Dec. 8, 1942.   G. H. SWART   2,304,718
STRUCTURAL MEMBERS AND METHOD OF FABRICATING THE SAME
Filed July 15, 1940   2 Sheets-Sheet 1

INVENTOR
Gilbert H. Swart
BY Evans + McCoy
ATTORNEYS

Dec. 8, 1942.  G. H. SWART  2,304,718
STRUCTURAL MEMBERS AND METHOD OF FABRICATING THE SAME
Filed July 15, 1940  2 Sheets-Sheet 2

INVENTOR
Gilbert H. Swart
BY Evans + McCoy
ATTORNEYS

Patented Dec. 8, 1942

2,304,718

UNITED STATES PATENT OFFICE 2,304,718

STRUCTURAL MEMBER AND METHOD OF FABRICATING THE SAME

Gilbert H. Swart, Wabash, Ind., assignor to The General Tire & Rubber Company, Akron, Ohio, a corporation of Ohio Application July 15, 1940, Serial No. 345,663

4 Claims. (Cl. 189—34)

This invention relates to composite metal articles and to a method of rigidly uniting metal to metal. It particularly relates to structures, such as panels, etc., adapted for airplane, Pullman car, and vehicle construction, and having relatively thin metal plate, foil, or the like, firmly fastened to heavier reinforcing members.

In the preparation of airplane fuselages, door panels, and especially in the application of metal wing coverings, etc., it is frequently necessary to join thin sheets or foils of aluminum, stainless steel, or the like together, or to fasten such sheets to reinforcing or anchoring members. Attempts have been made to form such structure by welding, but such procedure is exceedingly difficult when a thin sheet is to be fastened to a heavier supporting structure, the thinner material usually being burned to such a degree that an unsuitable union is produced. Also, when thin materials such as metal foil, etc., are joined together by welding, the sheet of foil adjacent the weld becomes brittle and failure readily occurs at that point. Because of these difficulties in welding, it has heretofore been the usual practice to fasten thin sheets or foils together or to their supporting members by riveting, even though such procedure is a slow, costly and tedious process, and the joint has relatively small contact area and relatively poor fatigue resistance.

It is, therefore, an object of this invention to provide a method of making panels suitable for doors of airplanes, cars, etc., having substantially the rigidity and strength of a welded or riveted structure, but having improved fatigue resistance.

It is another object of this invention to provide composite articles of manufacture having metal rigidly joined to metal without welding or riveting, and having relatively high strength, substantial heat resistance, and some tendency to absorb vibration.

Another object of this invention is to provide a method for joining thin sheets of metal, such as aluminum or stainless steel, together, so that the joined materials have high strength and flexing resistance.

It is a further object of this invention to provide a more economical method for making metal panels and other structures having a relatively thin sheet of metal joined to supporting metal surfaces.

It is a still further object of this invention to provide structures having thin sheets of metal joined together or to supporting elements in a less costly manner, and without welding.

Other objects will be apparent from the following description of the invention, as illustrated by the drawings, in which.

I have found that rigid metal joints may be prepared with the adhesives commonly used for adhering rubber to metal, and that when properly prepared a joint having the desirable characteristics of a welded metal joint may be formed without producing brittleness in the metal.

The joints prepared in accordance with the present invention have metal surfaces joined together through a film of an adhesive which is suitable for bonding rubber to the particular metal involved. For high strength in the joint, the adhesion should be effected over a considerable area, and it is desirable that the two metal parts which are to be adhered together overlap each other and have the same general or mating surface contours.

If the metal surfaces to be overlapped are both relatively flat, so that there is considerable contact therebetween when placed together, a joint sufficiently strong may be obtained by the use of a coating of the metal-to-rubber adhesive on each of the metal surfaces or even one coating disposed between them.

Commercial surfaces, such as sheets or plates, are seldom truly complemental, and there are portions which may be out of contact when the surfaces are brought together. In order to mitigate the effect of such surface variations, etc., and to provide better contact between the joined surfaces, I prefer to dispose a relatively thin layer of a suitable, curable rubber compound between the coated metal surfaces to be joined.

Figures 3, 4, 5:
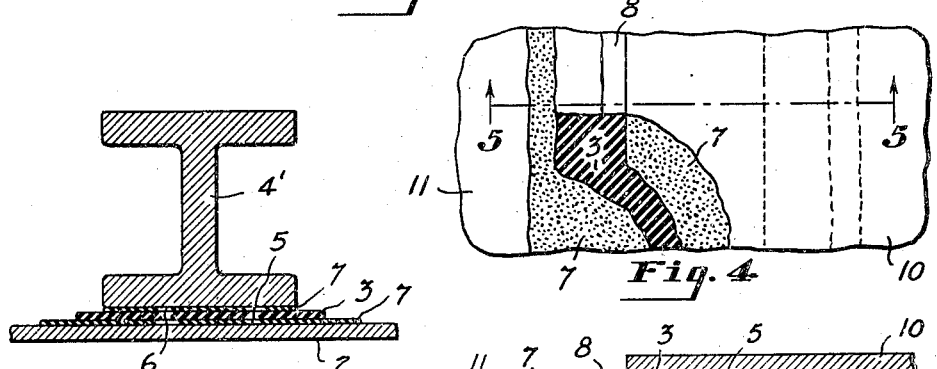
Fig. 3 is an enlarged view of suitable panel elements as they are being assembled, and shows the rubber-to-metal adhesive applied on the surfaces of the metal parts.
Fig. 4 is a plan view of a portion of a lap joint between thin metal sheets, with portions broken away to show the construction of joints embodying the invention.
Fig. 5 is an elevational, sectional view on the line 5—5 of Fig. 4, and enlarged so as to show the films of adhesive.

According to the preferred process of the invention, the first steps of which are particularly illustrated by Fig. 3, overlapping surfaces 5 and 6 of the metal parts, such as the elements 2 and 4, to be joined are each coated where they will overlap with a suitable metal-to-rubber adhesive 7 which may be applied as an extremely thin coating or film, such as one having a thickness of .001" or .002", or even less. A dissolved adhesive is usually preferred and one or more coats may be used, depending on the characteristics of the particular adhesive. A relatively thin layer or sheet of rubber compound 3, such as sheet $\frac{1}{16}$" thick, or less, is then disposed between adhesive layers 7. The coated surfaces 5 and 6 are then preferably pressed together and vulcanized by heat while the pressure is maintained. Vulcanization may be accomplished according to the usual procedure either in open steam or in air as desired.

It will be seen that by varying the pressure the thickness of the film of rubber separating the metal parts can be varied. It is preferable that the film of rubber be relatively thin and of the order of from about .001" to about .05" or so. It is usually preferable to apply sufficient pressure between the elements 2 and 4 to cause a substantial portion 8 (Fig. 2) of the excess rubber from the layer 3 to flow from between the coated surfaces and thus form a layer which is sufficiently thin to provide a substantially rigid connection between the metal parts. A strong joint may, however, be produced with certain available adhesives without appreciable pressure, and when a rubber compound having the property of curing at normal temperatures is used, heat need not be applied.

While specific figures have been cited as illustrative of the thickness of the adhesive and of the rubber sheet to be applied, is to be understood that these may be varied considerably, but that applicant's invention does not contemplate the application of layers of rubber sufficiently thick to allow appreciable relative movement between the joined surfaces.

It will also be seen that if the area of control between the metal surfaces to be joined is larger, a somewhat thicker layer of rubber may be used without permitting substantial relative movement of the joined surfaces.

The rubber-to-metal adhesive 7 may be any one of those adhesives suitable for adhering rubber to metal, and possessing suitable strength at temperatures where it is desirable to use the article. When a strong adhesive is used, it has been found that several hundred pounds tension are required to separate metal strips joined by a lap joint having but one square inch of area. It is preferable that the adhesive be applied in solution form, but it may in some cases be applied in the form of thin sheets or films. The adhesive should also have the property of bonding under heat to the particular metal to be used in the manufactured article. When only low temperatures are encountered and when the articles may be cooled before the pressure is released, it may be a thermoplastic rubber isomer, such as is disclosed in Geer Patent 1,617,588. A rubber hydrochloride-sulfur mixture, as disclosed in the Winkelmann et al. Patents 2,139,992 and 2,147,620, or a vinylacetylene polymer, as described in the Humphrey Patent 2,144,495, are examples of other suitable adhesives. A particularly strong joint which is the most satisfactory for joining all commercial metals, including aluminum and stainless steel, is obtained through rubber derivatives available under the trade-mark name "Reanite." These derivatives are less plastic than rubber at elevated temperatures and are fully described in the Griffith applications Serial No. 292,700, filed August 30, 1939, and Serial No. 277,086, filed June 2, 1939. Reanite adhesives have exceptionally high strength at elevated temperatures, and when they are applied to metal and allowed to dry it has been found that there is less tendency for them to be rubbed therefrom by the relatively high flow of the rubber compound, which usually takes place as the metal surfaces are pressed into close proximity during the curing step.

The rubber layer which is sandwiched between the coated metal surfaces may be of any rubber compound suitable for adhering to metal, as is readily prepared by those skilled in the art. The rubber may consist wholly or partially of one or more synthetic rubbers or reclaim, but it should have substantial strength when cured. It should preferably be applied in thin sheet form to minimize the flow of rubber, as the metal surfaces are pressed relatively close together.

Figure 1:
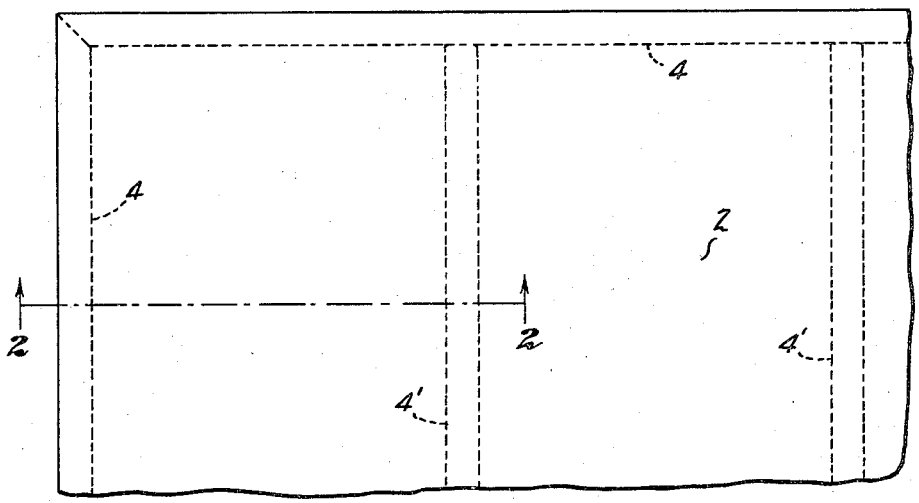
Figure 1 is a plan view of a portion of a suitable door panel embodying the invention.
Figure 2:
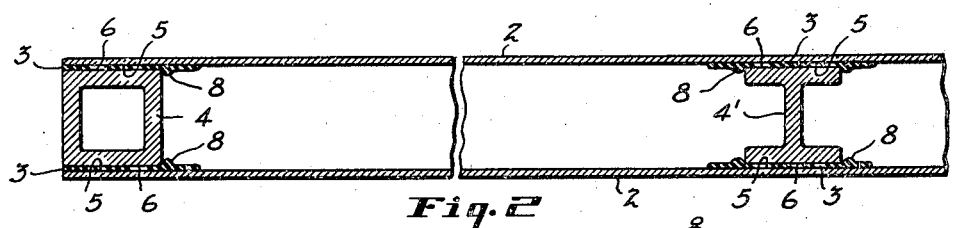
Fig. 2 is a vertical, sectional view on the line 2—2 of Fig. 1, showing structural elements of the panel.

Referring more particularly to the drawings where like parts are designated by like numerals of reference throughout the several views, a panel especially suitable for doors of airplanes, or for separating the berths of Pullman cars, is illustrated in Figs. 1 and 2. Such a panel may have one or more relatively thin outer surface members 2, which may be aluminum, stainless steel, etc., of the desired contour adhesively attached through a rubber film or layer 3 to suitable reinforcing or stiffening members 4. The rubber 3, which is disposed between the surfaces 5 and 6 of the relatively thicker reinforcing member and of the outer sheets, respectively, is attached to the surfaces 5 and 6 through films of metal-to-rubber adhesive applied directly to the surfaces 5 and 6. The reinforcing or stiffening member 4 may have any suitable cross sectional shape, such as that of a square tube 4, an I-beam 4', a channel, etc., but it is preferable that a square tube or channel be used along exposed edges of the panel so as to form a finished appearance.

Fig. 4 illustrates a lap joint between two metal foils 10 and 11 formed by the process of this invention. Such a joint is especially desirable for rapidly joining the stainless steel or aluminum foil coverings of airplane wings and fuselages. It is prepared by coating the lapped surfaces 5 and 6 of the metal member with a film 7 (shown enlarged in thickness) of metal-to-rubber adhesive, disposing a rubber layer 3 between the coated surfaces and vulcanizing the rubber layer with heat and sufficient pressure to cause rubber to flow from between the metal surfaces 5 and 6. The film of rubber 3 has sufficient thinness when vulcanized to provide a substantially rigid joint.

Figure 6:
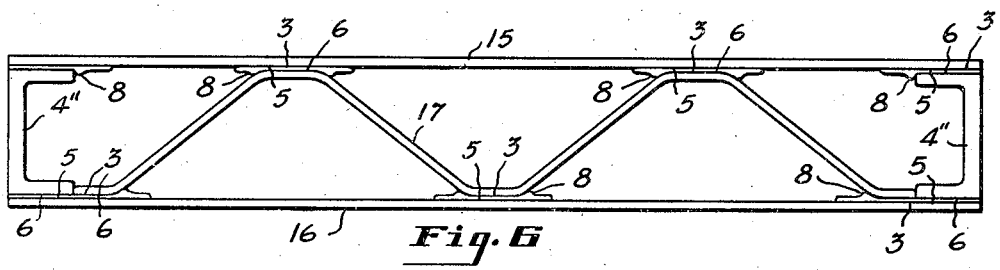
Fig. 6 is an elevational view of a structural member embodying the invention.

Referring to Fig. 6, a composite, structural member embodying the present invention has an upper flange member 15 and a lower flange member 16, which are adapted to withstand the compressive or tensile stresses corresponding to those in the upper and lower flanges of an I-beam, and a reinforcing or web member 17 disposed between the flange members and adapted to transmit relative stress between the two flange members. The flange members are rigidly attached to the web member through the rubber layer 3 and films (not shown) of metal-to-rubber adhesive. Additional reinforcing end members, such as channels 4" are preferably used at the ends or along the edges of the structural member.

Figure 7:
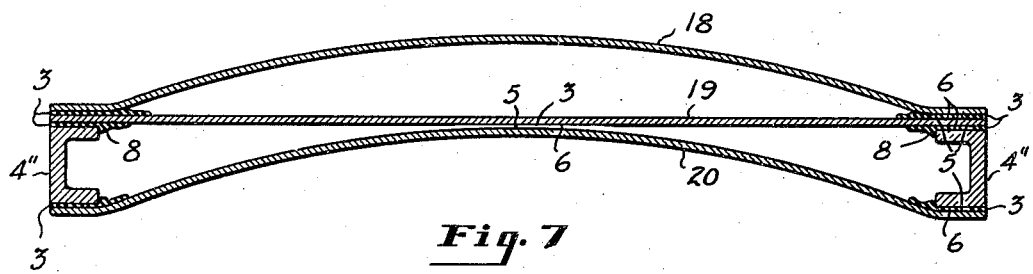
Fig. 7 is a longitudinal, sectional view of a curved panel embodying the present invention.

A curved panel especially suitable as an airplane bomb rack door is illustrated in Fig. 7. Such a curved panel may include an upper curved surface member 18, a relatively flat, reinforcing member 19 fastened along its edges to the edges of the curved member through films of rubber-to-metal adhesive (not shown) applied to the surfaces 5 and 6. Preferably, a rubber film 3 is sandwiched between the films on the surfaces 5 and 6, and cured in situ under heat and pressure. The lower curved surface member 20, similar in shape to member 18, is adhesively attached to the member 19 through the rubber layers 3 and through reinforcing members, such as the channels 4", disposed along the edges and between the surface members 18 and 20. These adhesively attached, edge reinforcing members also serve to space the edges of the surface members 18 and 20 from each other.

Referring particularly to Fig. 5, an insulated panel may comprise relatively thin upper and lower surface members 22 and 23, respectively, which are spaced from and adhesively attached to one or more inner division members 24 through spacing means such as reinforcing strips 25. The spaces thus formed may be filled with insulation material 31. Divisional members 24 may be separated by reinforcing members 4, which are rigidly attached through the divisional members 24 by suitable films (not shown) of adhesive and rubber layers 3 to the upper and lower surface members 22 and 23, respectively. The rubber films 3 have sufficient thinness to produce a substantially rigid structure.

Figure 8:
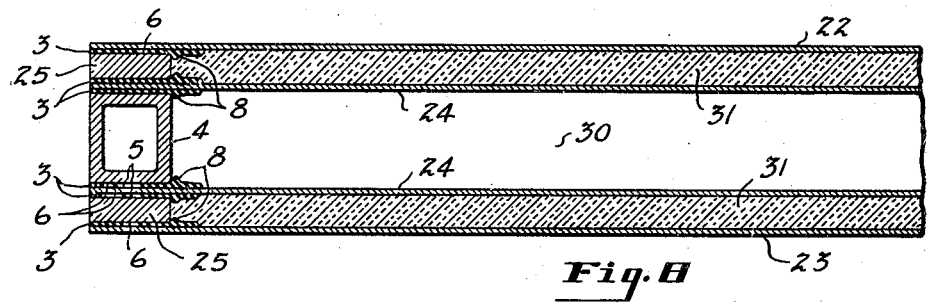
Fig. 8 is a horizontal, sectional view of a portion of an insulated door embodying the present invention.
Figure 9:
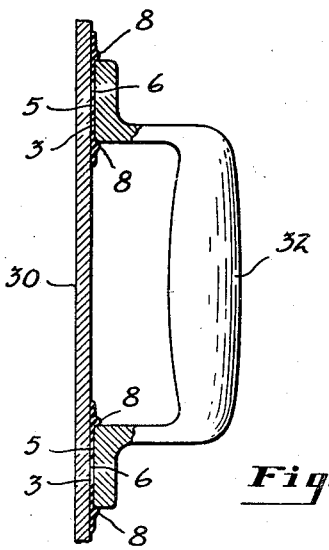
Fig. 9 is an elevational view, partly in section, of a portion of a metal strip having a handle attached thereto by the method of the present invention.

A satisfactory method for rigidly uniting relatively heavy metal members, such as hardware including hinges, handles, etc., to relatively thin metal surfaces is illustrated by Fig. 8. A handle 32 is rigidly fastened to the metal surface member 30 through the rubber films or layers 3, which are attached to the respective surfaces 5 and 6 of the handle and surface members by films of adhesive deposited thereon, and which have sufficient thinness to produce a substantially rigid union between the handle and the surface members.

It will be seen that the rubber layer in the articles prepared according to the present invention is relatively thin so as to provide a relatively rigid connection between metal parts. The use of a thin film enables the apportionment of strain among the metal elements of the article in the same manner as welded or riveted articles. The articles are, however, much more satisfactory than riveted or welded articles in many instances, and are especially adapted for aeroplane construction where thin sheet metals must be solidly joined to heavy reinforcing members. In such applications they improve the durability of the product as well as decrease the time required for manufacture.

In the appended claims, the term "rubber" is used in a generic sense to include synthetic rubbers and rubber reclaim, as well as natural rubber or mixtures of these materials.

The principles of the present invention may be utilized in various ways, numerous modifications and alterations being contemplated, substitution of parts and changes in construction being resorted to as desired, it being understood that the embodiments shown in the drawings and described above are given merely for purposes of explanation and illustration, without intending to limit the scope of the claims to the specific details disclosed.

What I claim is:

1. A lap joint between two metal members covering a relatively restricted area of at least one member, comprising a thin layer of solid rubber between layers of adhesive bonding the rubber to the metal, with the whole comprising a rigid joint of the order of rigidity of a welded joint.

2. An article having a plurality of metal members, said members being joined through a relatively restricted area of at least one member, the joint between said metal members comprising a thin layer of solid rubber between the layers of adhesive bonding the rubber to the metal, with the whole comprising a rigid joint of the order of rigidity of a welded joint.

3. A method of making rigid joints between metal members which comprises coating the surfaces to be joined with a suitable adhesive capable of adhering rubber to metal, said surfaces covering a relatively restricted area of at least one member, disposing a relatively thin layer of a curable solid rubber compound between said coated surfaces and curing the rubber so disposed under heat and pressure, whereby a rigid joint of the order of rigidity of a welded joint is produced.

4. A panel comprising a relatively thin outer metal surface member and a reinforcing member attached to a relatively restricted area of the surface of said outer member through a thin layer of solid rubber between layers of adhesive bonding said rubber to said restricted area of said outer surface member and to said reinforcing member, the joint between said reinforcing member and said metal surface member being rigid and of the order of rigidity of a welded joint.

GILBERT H. SWART.